(12) United States Patent
Arora

(10) Patent No.: US 9,519,536 B2
(45) Date of Patent: Dec. 13, 2016

(54) ELECTRONIC MANAGEMENT SYSTEM FOR TECHNOLOGY SUPPORT REPORTING

(71) Applicant: BANK OF AMERICA CORPORATION, Charlotte, NC (US)

(72) Inventor: Piyush Arora, Gurgaon, IN (US)

(73) Assignee: Bank of America Corporation, Charlotte, NC (US)

( * ) Notice: Subject to any disclaimer, the term of this patent is extended or adjusted under 35 U.S.C. 154(b) by 94 days.

(21) Appl. No.: 14/588,418

(22) Filed: Jan. 1, 2015

(65) Prior Publication Data

US 2016/0196173 A1 Jul. 7, 2016

(51) Int. Cl.
G06F 11/00 (2006.01)
G06F 11/07 (2006.01)
G06F 11/32 (2006.01)
G06F 11/36 (2006.01)
G06F 11/30 (2006.01)
G06F 11/34 (2006.01)

(52) U.S. Cl.
CPC .......... *G06F 11/079* (2013.01); *G06F 11/324* (2013.01); *G06F 11/3031* (2013.01); *G06F 11/3409* (2013.01); *G06F 11/3664* (2013.01)

(58) Field of Classification Search
CPC .............. G06F 11/0769; G06F 11/0775; G06F 11/0781; G06F 11/079; G06F 11/3664
See application file for complete search history.

(56) References Cited

U.S. PATENT DOCUMENTS

| | | | | |
|---|---|---|---|---|
| 5,790,780 A | * | 8/1998 | Brichta | G06F 11/2205 714/40 |
| 7,464,119 B1 | * | 12/2008 | Akram | G06F 11/008 702/184 |
| 7,730,363 B2 | * | 6/2010 | Takezawa | G05B 23/0248 714/21 |
| 7,779,300 B2 | * | 8/2010 | Moon | G06F 11/0709 714/25 |
| 2004/0158762 A1 | * | 8/2004 | Abraham, Jr. | G06Q 10/04 714/1 |

* cited by examiner

*Primary Examiner* — Joseph Kudirka
(74) *Attorney, Agent, or Firm* — Michael A. Springs; Moore & Van Allen PLLC; Peter B. Stewart

(57) ABSTRACT

Systems and methods for generating a visual indicator based on receiving a report of a transaction processing error, the error comprising an informality in a software instruction code executed during a first attempt to process a transaction. The systems may be configured to determine a preconfigured time period for correcting the software instruction code causing the transaction processing error and compare it to the actual time it took to correct the software instruction code to determine whether the processing error was corrected within the preconfigured time period. The system and method may then generate and communicate a visual indicator based on determining whether the error was corrected within preconfigured time period.

20 Claims, 9 Drawing Sheets

Date — 404
Start Date* 10/1/2014
End Date* 10/1/2014

Location — 406
Country*          City

Business Leaders — 408
Leaders
2nd Level
Business

PGP Group — 410
PGP

Priority* — 412
☑ ALL    ☑ P1    ☑ P2    ☑ P3    ☐ P4

Next — 414
Reset — 416

ELECTRONIC MANAGEMENT SYSTEM FOR TECHNOLOGY SUPPORT REPORTING

FIELD

This invention relates generally to the field of electronic collection, analysis, and reporting of incidents in a technology management system.

BACKGROUND

The advances in technology have provided several benefits to various markets. Machines are capable of performing tasks, processes and calculations at high rates. Businesses rely on the speed that these machines perform work in order to maintain a low cost of operation. When the machine malfunctions or becomes inoperable, the cost of operation rises. Therefore, it is beneficial for a company to identify and return to operation a machine that is malfunctioning or has become inoperable in a timely manner.

In some cases, a system may not be completely inoperable but may suffer an impedance to perform at a normal operating condition. Similar to a machine becoming inoperable, a machine that fails to meet normal operating conditions disrupts the normal flow of business for a company, depending on the criticality of the machine.

To minimize the effects of machines that perform lower than normal operating conditions or become inoperable, it is necessary for a business to track such conditions. Such tracking may include collecting information that a machine has become inoperable or has suffered an impedance. Other tracking may be used to determine how the machine was restored.

By tracking, these parameters, a business may lower the amount of time that a machine is inoperable or is impeded. As a result of lowering this time, business production increases.

BRIEF SUMMARY

The present invention detailed systems and methods for generating electronic visual indicators based on receiving incident reports relating to a reduction in capacity of a machine to perform a function, where the machine was preconfigured to perform such function. In some embodiments, the present invention receives a report of a transaction processing error. The error may relate to a run-time error received during an attempt to process a transaction. In other embodiments, the error may be a communication error over a network.

In some embodiments, the present invention determines a time period for correcting software instruction code that has been identified as causing the transaction processing error. The present invention may use various factors in determining the amount of time for correcting the software instruction code, such as determining a criticality factor of the machine attempting to execute the software instruction code.

After determining the time period for correcting the software instruction code, the present invention receives a second report that the informality in the software instruction code causing the transaction processing error was corrected, based on an execution of the corrected software instruction code during a second attempt to process the transaction.

Once the system receives the second report that the informality in the software instruction code has been resolved, the present invention determines an amount of time between receiving the first report and receiving the second report. The present invention compares the amount of time between receiving the first report and receiving the second report with the time period for correcting the transaction processing error. In some embodiments, the present invention determines whether the software instruction code causing the transaction processing error was corrected within the preconfigured time period based on comparing the amount of time between receiving the first report and the second report with the time period for correcting the transaction processing error.

Finally, the present invention may be configured to generate a visual indicator based on determining whether the error was corrected within preconfigured time period and once the visual indicator has been generated, communicate the visual indicator.

In some embodiments, the present invention identifies a technician capable of correcting the software instruction code causing the transaction processing error. The system may then generate a work order detailing the error and a procedure for correcting the error. Once the system has generated the error, the system may then communicate the work order to the identified technician.

In other embodiments of the invention, the machine operating the software instruction code may be a server, a mobile device, a network, a cluster of computers, or any other system that uses a processor to execute software instruction code in order to perform a function. The present invention may be used to determine a transaction processing rate of the machine. For example, the present invention may determine the number of transactions the machine is capable of performing within a given amount of time. After the processing rate is determined, the present invention may further be configured to determine the time period for correcting the software instruction code causing the transaction processing error based on the transaction processing rate of the machine.

In other embodiments, the present invention determines a second machine capable of executing the software instruction code in order to process the transaction. After the invention has determined the second machine, the invention may communicate a request to the second machine to execute the software instruction code to process the transaction. In this embodiment, the present invention determines the time period for correcting the software instruction code causing the transaction processing error is based at least in part on the communicating the request to second machine.

In some embodiments, the present invention receives a history of errors, which it uses to determine a number of times the transaction processing error has occurred based on receiving the history of errors. The present invention may use the data received in the history of errors in order to generate the visual indicator. For example, the visual indicator may be based on the number of times the transaction processing error has occurred in the past.

In some embodiments of the invention, the visual indicator is a report and the present invention is configured to receive user input for filtering the report. After the present invention receives the user input, it generates the report based on that input.

In other embodiments, the visual indicator is a dynamic report comprising an interactive user control. The present invention is further configured to update the report based on a user interacting with the interactive user control, and updating the visual indicator based on receiving the request.

BRIEF DESCRIPTION OF THE DRAWINGS

Figure 1:
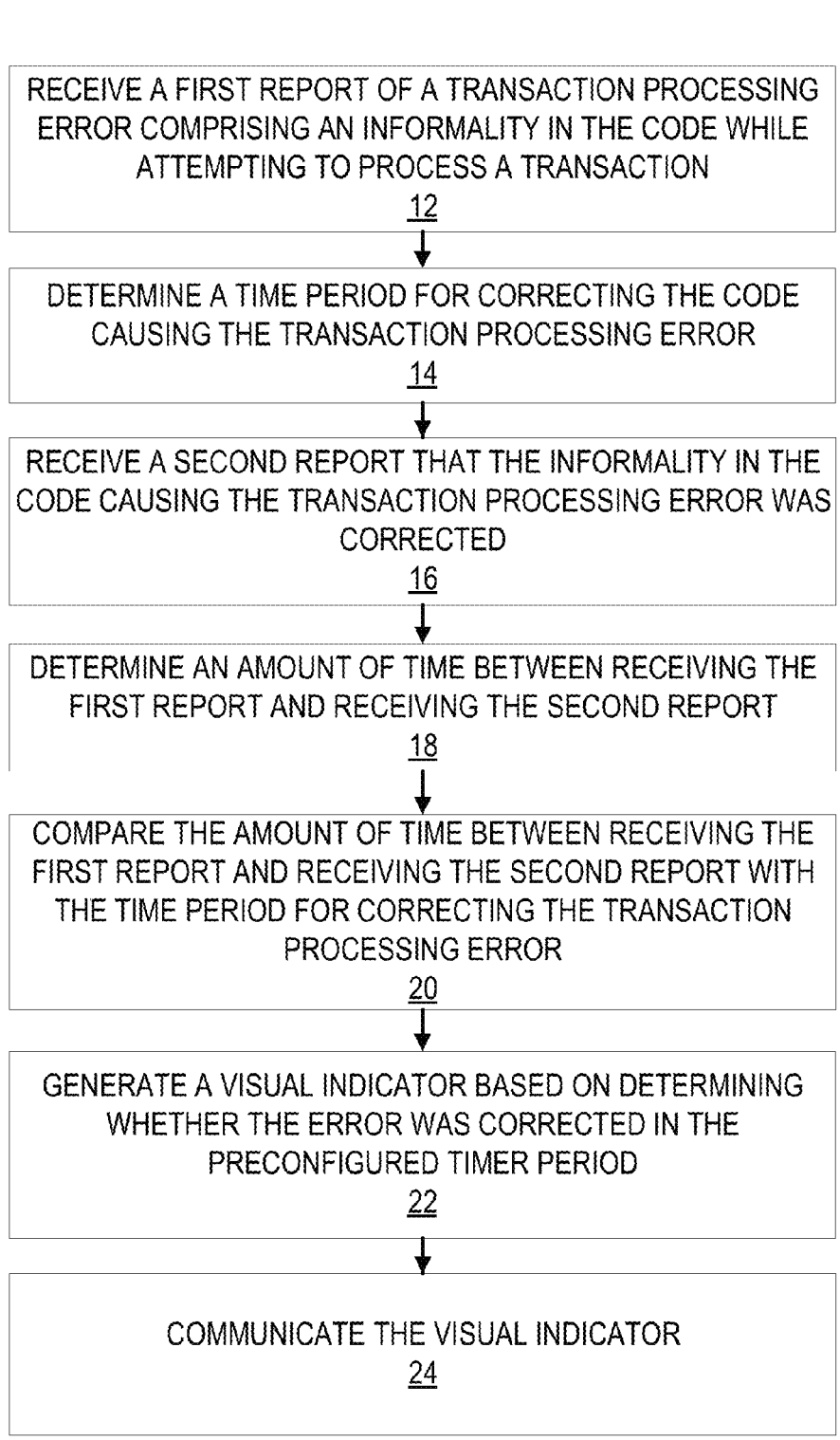
Figure 2:
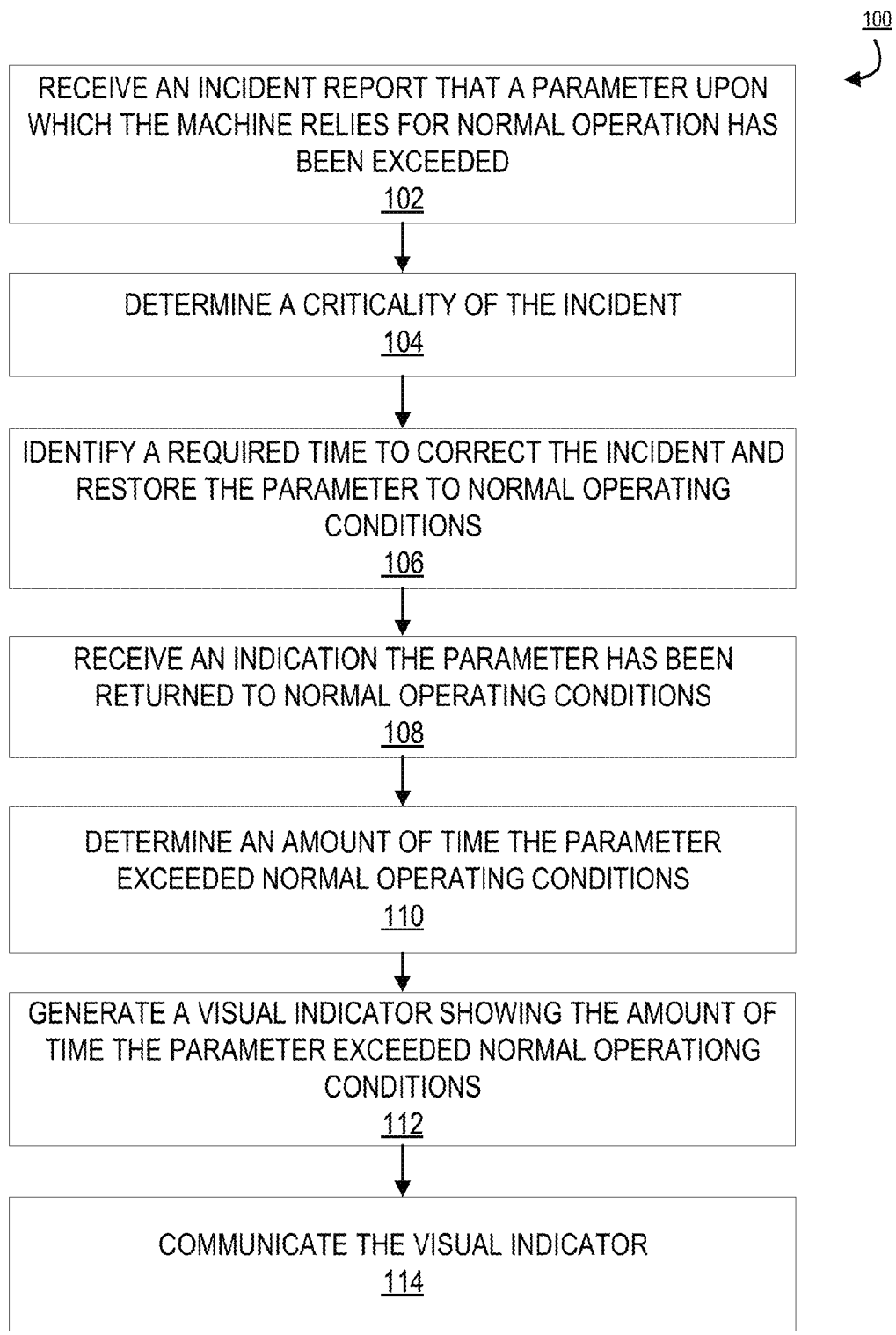
Figure 3:
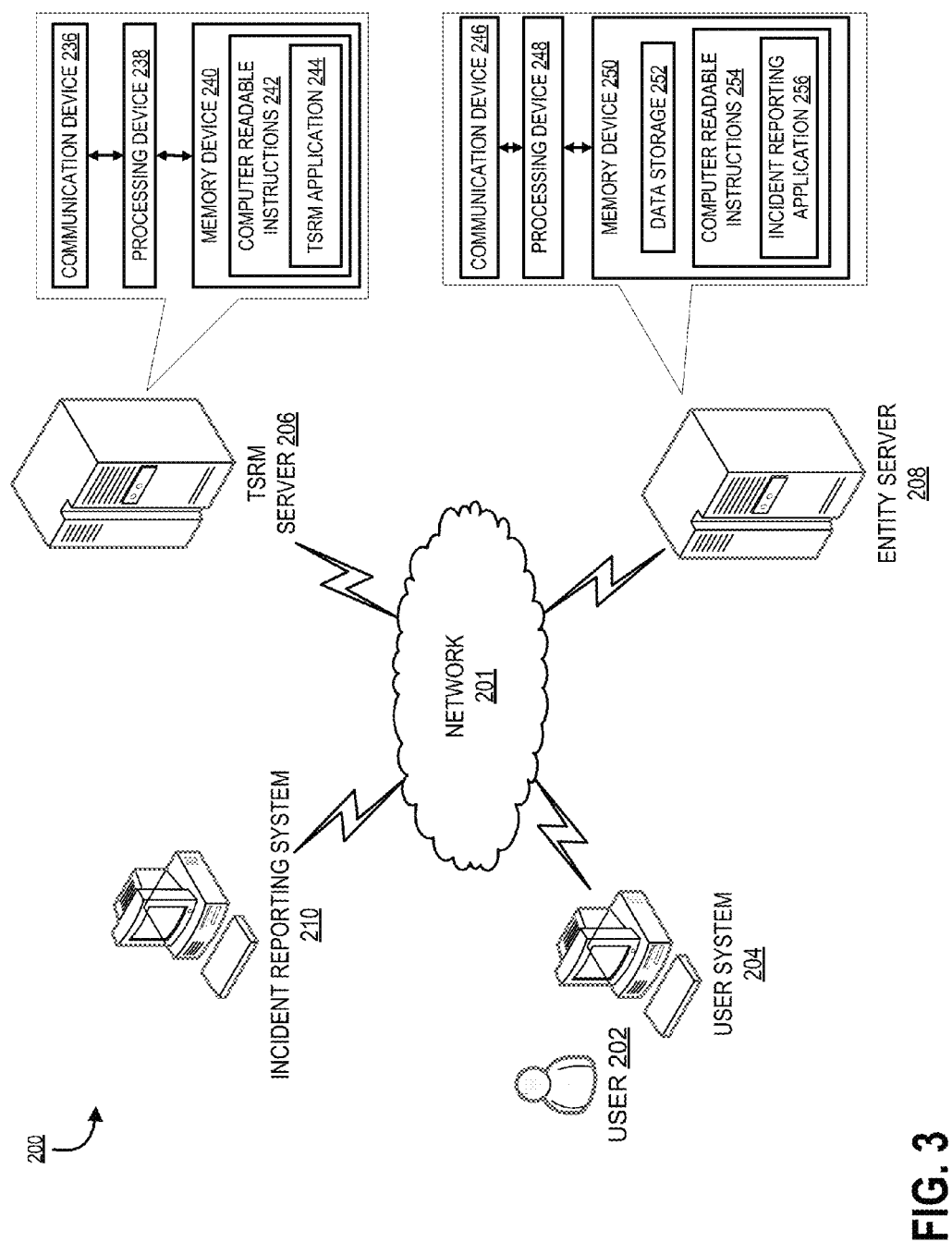

Having thus described embodiments of the invention in general terms, reference will now be made to the accompanying drawings, wherein:

FIG. 1 provides a high level process flow illustrating in general terms for generating a dynamic display for reporting work technology incidents;

FIG. 2 provides a high level process flow illustrating in general terms for generating a dynamic display for reporting work technology incidents;

FIG. 3 provides an illustration of a technology support reporting manager tool, in accordance with various embodiments of the invention.

Figure 4A:
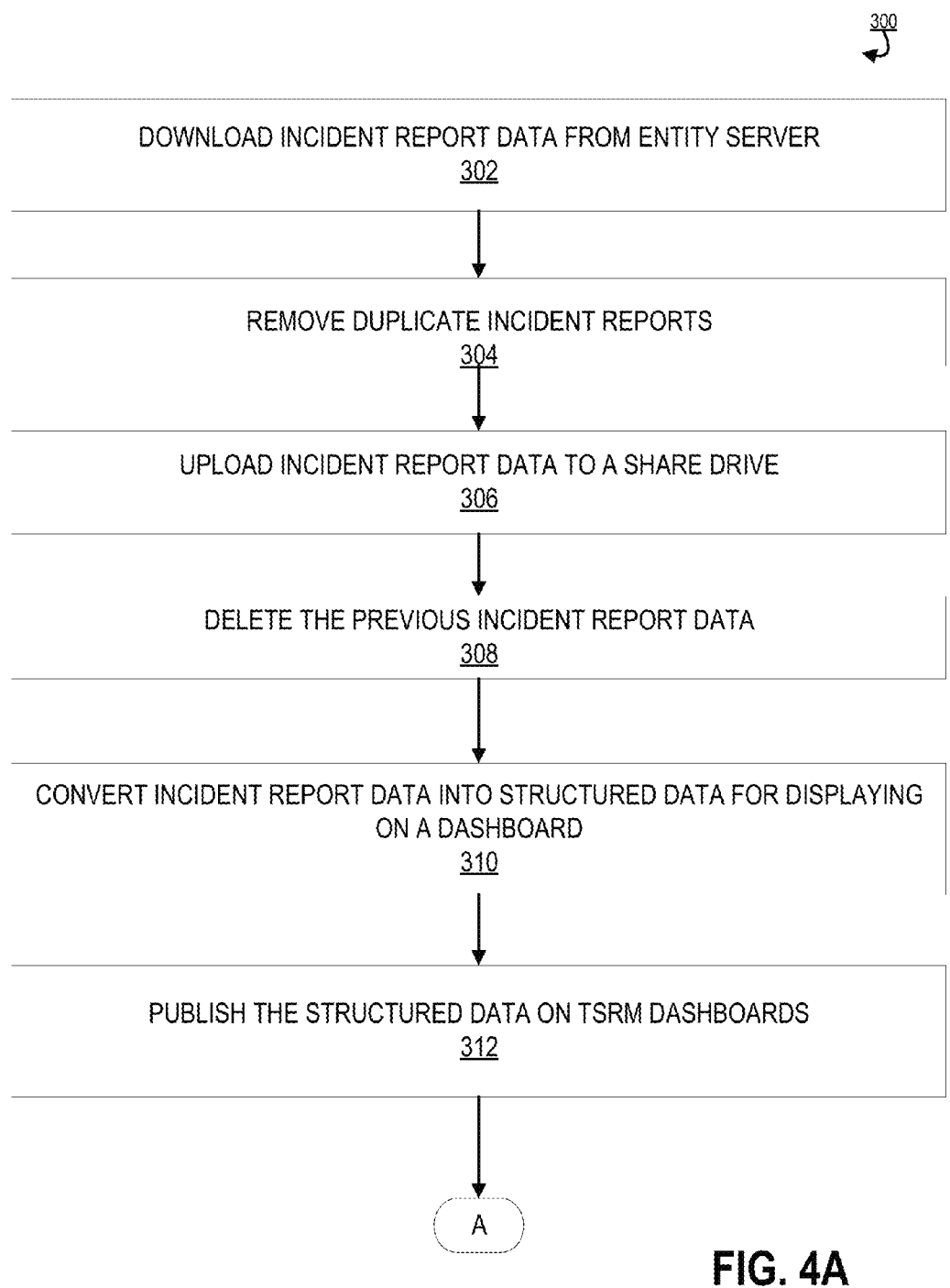

FIG. 4a provides a process flow illustrating receiving technology incident and work order data in order to generate dynamic reports.

Figure 4B:
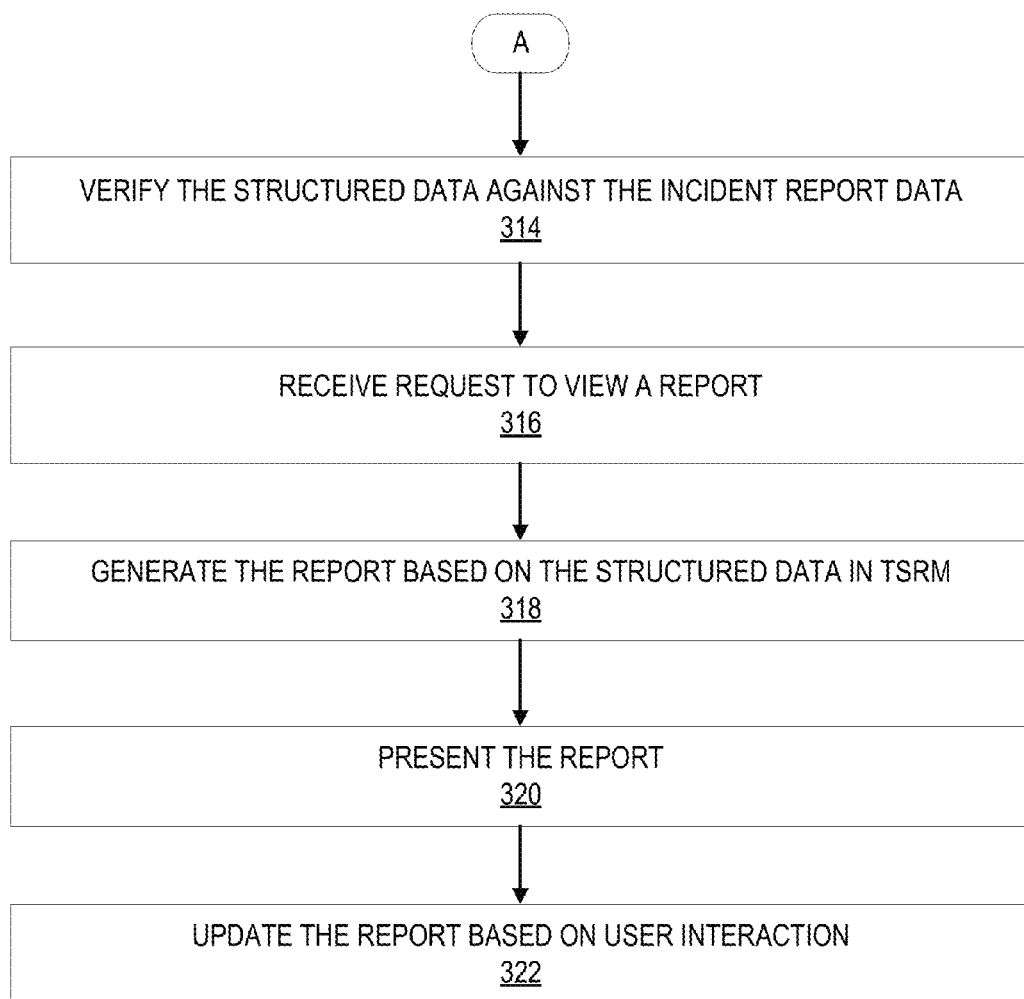

FIG. 4b provides a process flow illustrating receiving technology incident and work order data in order to generate dynamic reports.

Figure 5B:
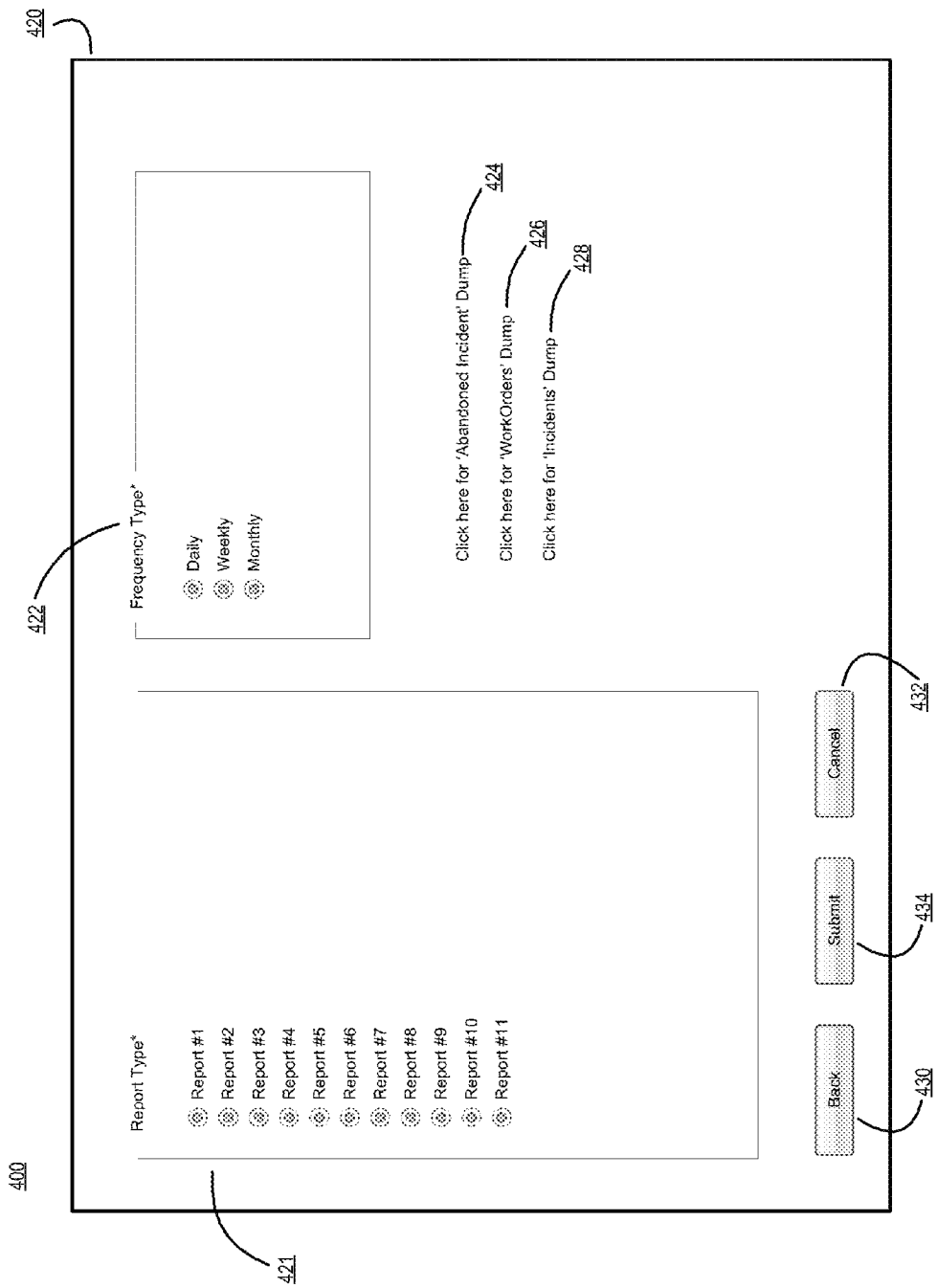
Figure 6:
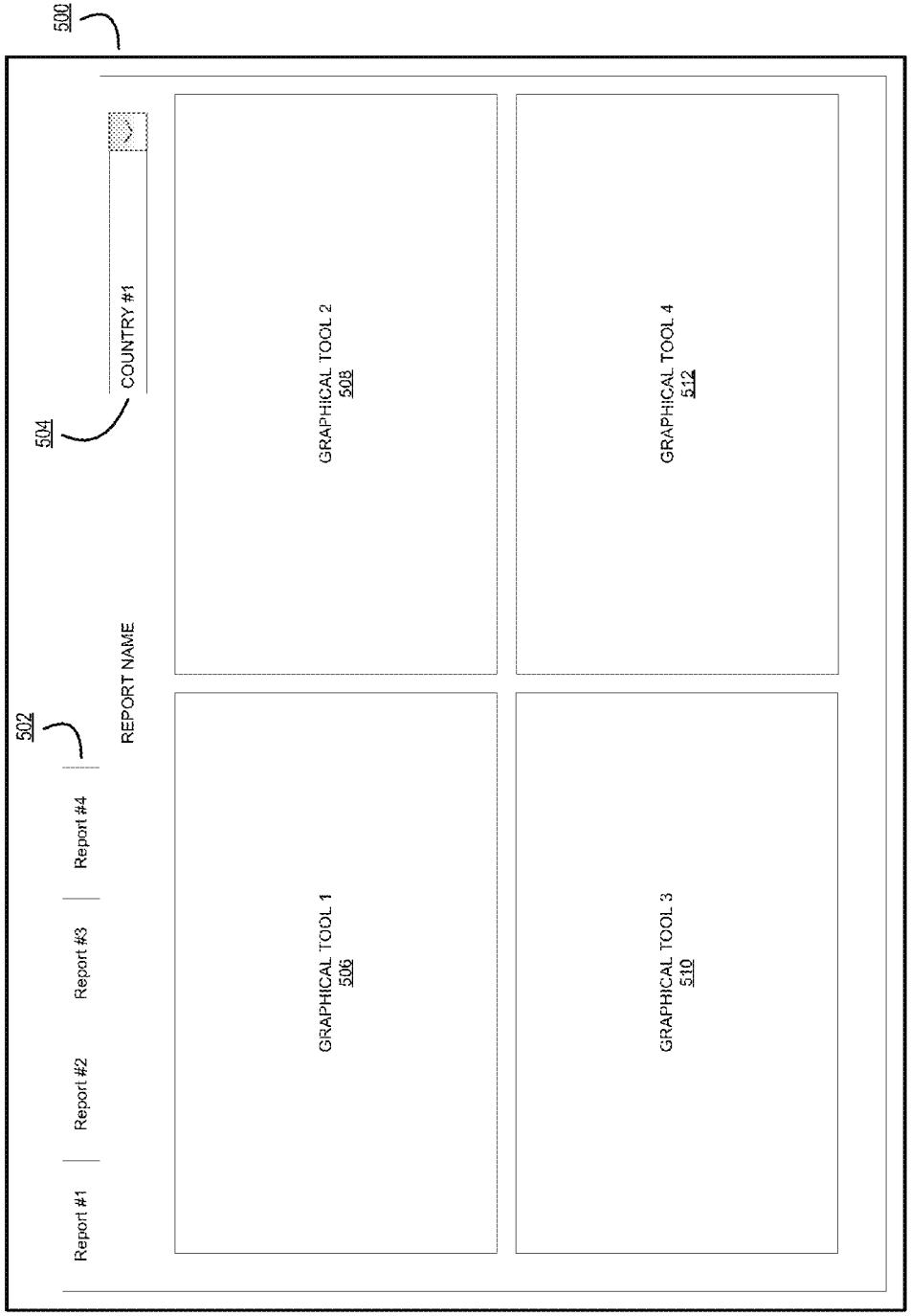
Figure 7A:
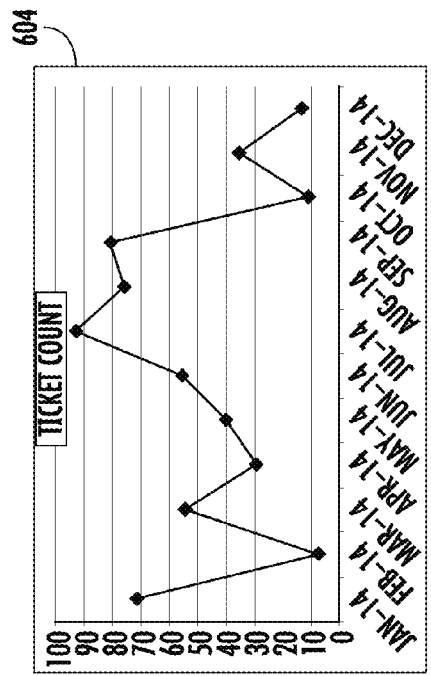
Figure 7B:
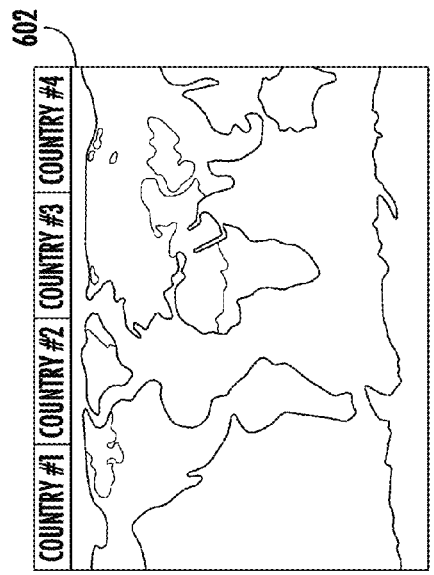

FIG. 5a is an example of an multi-page form which allows a user to enter criteria for generating a report based on the criteria;

FIG. 5b is an example of an multi-page form which allows a user to enter criteria for generating a report based on the criteria;

FIG. 6 is an example of a dynamic report generated using search criteria entered in from a user;

FIG. 7a is an example of a graphical tool as displayed in a dynamic report;

FIG. 7b is an example of a graphical tool as displayed in a dynamic report; and

Figure 7C:
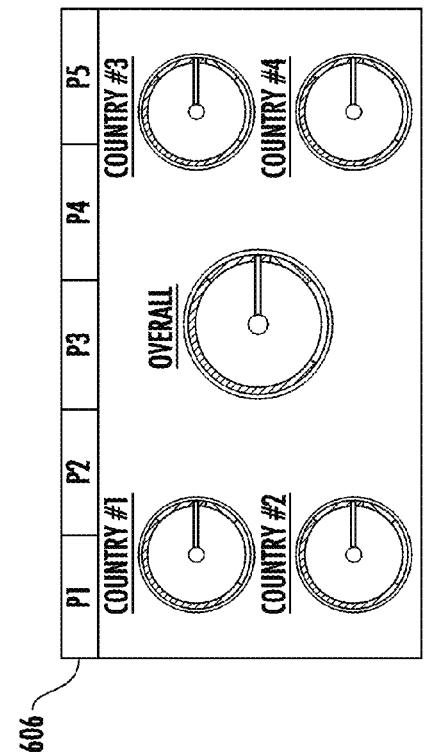

FIG. 7c is an example of a graphical tool as displayed in a dynamic report.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user." It will be appreciated by someone with ordinary skill in the art that the user may be an individual, financial institution, corporation, or other entity that may have documents associated with accounts, transactions, or the like with the entity providing the system. The term "group" as presented herein may refer to one or more lines of business, groups, subsidiaries, business partners, or the like that are associated with an entity that has triage reporting and support.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have electronic document or data storage needs.

The term "machine" or "entity machine" shall refer to a computer or serve that is either physically located and managed within entity, managed outside of the entity such as a collocated machine, a virtual machine that is operated by the entity but managed as part of a virtual environment, an instance of a cloud computing system.

If the machine is operated as part of a cloud computing system, the machine may refer to a collective infrastructure of computers and servers each preconfigured to communicate with one another to provide common functionality as if they were one collective machine. The machine would have all the functionality and capabilities of any single machine with a given processor, memory, communications, and the like. Each individual machine within the collective machine would likely have a separate processor, memory, and the ability to communicate with other machines, but would be configured to perform in combination with the other machines in order to perform the functionality of the collective machine. In addition, within the collective machine environment, virtualized machines may be setup which would be capable of performing functionality, and communicating as if it were an individual machine. The resources used by the virtualized server would be shared with other virtualized servers being run as part of the collective machine. Therefore, the virtualized server would in and of its self not have a processor dedicated to perform its operations but would share a collection of processors. Each virtualized server is considered to be an individual machine.

In other embodiments, a dedicated platform operated within a computing device as explained herein may be considered a machine. As defined herein, a dedicated platform shall refer to a group of functions that are executed by a computing device. The group of functions may refer to all or some of the functions of the computing device. The group of functions may include communicating over a network, executing software instruction code through a processing device, interacting with an operating system, and the like. A dedicated platform may have restraints placed upon it as to prevent the dedicated platform from accessing functionality of the computing device. Additionally, a computing device may host multiple dedicated platforms. An example of a dedicated platform would be an File Transfer Protocol (FTP) server. The server has access to the functionality of the operating system to communicate over a network, access user information, and manipulate files stored within the memory of the computing device. The FTP server lacks access to actually cause a software instruction code or script to be executed however. The FTP server may grant multiple users to access individual file storage areas and not access areas that the secured. The computing device that hosts the FTP server may also have functionality to host other dedicated platforms.

As used herein, the term "incident" or "technology incident" shall refer to either the inability of a machine to perform a functionality for which the machine was preconfigured to perform, or the ability of the machine to perform the function has been diminished in some capacity. The "incident period" shall refer to the time in between when the incident began and the time when the incident was corrected.

As used herein, the term "work order" shall refer to a document, communication or the like that contains information regarding an incident. Typically, the work order will be communicated to at least one technician to advise the technician of the incident and prompt the technician to take action to correct the incident. The work order may contain information related to the machine upon which the incident occurred. Additionally, the work order may be part of a maintenance management process by which the work order is used to order parts, determine a procedure in order to correct the incident and the like.

Correction of the machine may be a result of an automated correction routine, a manual adjustment or correction, or the condition which created the incident changed such that the incident was cleared.

As used herein, the term "transaction" shall refer to any transaction typically performed between multiple computing devices or a transaction performed on a single computing device based on the computing device receiving an external communication or command. The communication may be a result of the computing device receiving a communication from another computing device or by receiving input from a non-computing device (i.e. human interaction). Additionally, the transaction may be a result of the computing device being configured to perform the transaction. In some embodiments, the computing device may perform the function on a timely basis. In other embodiments, the computing device may perform the function as a result of a trigger event. The trigger event may be related to a software or hardware configuration of the computing device. For example, the computing device may perform the transaction based on the computing device determining that a level of a storage device of the computing device has exceeded a given capacity. In some embodiments, the transaction may be a function typically performed by a financial institution which may include transferring an amount of money between different financial accounts.

The transaction may be performed over a distributed network where a transaction is performed using multiple computing devices which are communicably couple to one another over the network. The network may be any type of network that allows communication between the multiple devices, which may include but is not limited to a wired network, and a wireless network. Where the network is wireless, it may allow communications between computing devices using standard protocols such as Bluetooth and WIFI. Additionally, the network may further include communication between two devices using pairing.

FIG. 1 provides a high level process flow 10 illustrating the process for generating a visual indicator based on comparing the amount of time between receiving a report that an error occurred within a system and receiving a report that the error was corrected with a determined time period for correcting the error. As illustrated in block 12, the process 10 is initiated by receiving a first report of a transaction processing error comprising an informality in a software instruction code while attempting to process a transaction. The transaction occurs as a result of an execution of the software instruction code. In some embodiments of the invention, the transaction processing error is a result of a run-time error. In such an embodiment, the software instruction code itself may not contain an error but the execution of the software instruction code may result in an error. For example, if the execution of the software instruction code directs a processor to cause a communication device to communicate with a server and the server is not available, the processor will generate an error based on the server not being available. Additionally, the runtime error may be a result of the receiving an unexpected result in a variable. For example, if the processor executed the software instruction code to search a scan a file in order to determine a variable and the file is not properly setup, the processor will generate a run-time error based on the file not being properly setup.

In other embodiments of the invention, the transaction error may be a result of a compilation error. In such an embodiment, the software instruction code may be either be source code that is compiled into machine code and executed by a processor or a script which is executed by a program or other application that is run by a processor. Where the software instruction code is source code, the error in the software instruction code may be as a result of the software instruction code containing a syntax error or other error that would cause the compilation process to generate an error. Where the software instruction code is a script, the application or program that interprets the script may generate a runtime error based on an error in the script. Because the script is not precompiled but is still interpreted in run-time, the error in the script may be as a result of a syntax error or other error that would normally cause a compilation error.

As illustrated in block 14 of the process 100, the process determines a time period for correcting the software instruction code causing the transaction processing error. In some embodiments, a machine, as defined herein, is used to execute the software instruction code. Determining the time period for correcting the software instruction code causing the transaction processing error may be based on a criticality factor of the machine. Such factors may be based on reliability standards commonly used in industry. For example, the criticality of a machine may be based on the rate at which it performs a function. Where the machine executes software instruction code to handle transactions, the rate of the machine may be determined based on the number of transaction the machine performs in a given period of time. In such an embodiment, the criticality of the machine is relative compared to the criticality of like configured machines. For example, if two machines were preconfigured to perform the same process and one machine had the capability to handle twice as many transactions as the other, the first machine would be more critical than the second.

In other embodiments, determining criticality based on the rate of the machine may be based on a loss rate for the machine not being able to either perform the transaction or not being able to perform the transaction at a critical rate. The critical rate is determined based on the number of transactions the machine receives compared to the number of transactions the machine is capable of processing. The loss rate is the difference between the transaction receiving rate and the machine capability rate times the amount lost per transaction the machine is not capable of performing within the given period of time. For example, if the machine is capable of performing 100 transactions per hour and the machine receives 150 transactions per hour, then the machine has a deficiency of 50 transactions per hour. Processing a transaction equates to $0.05 in profit; therefore, the loss rate of the machine is $2.50/hour.

In other embodiments, the criticality factor may be based on the presence of another machine capable of executing the same software instruction code as the first machine. Where two machines are capable of performing the same software instruction code, the reliability of the process increases and therefore the occurrence of one machine not being able to perform the function is not as significant compared to the existence of only machine capable of performing the function. However, it should be noted that where multiple machines are capable of performing the same transaction, reliability standards may still be applicable to the whole. The rate of two machines capable of performing the same function may be added together to determine a total capability rate of performing the function. If the incoming rate of transactions exceeds the total capability rate of both machines, the entire process still performs at a loss. Additionally, the occurrence of an error in one machine may also cause the error in the second machine. Therefore, the existence of multiple machines may be negated.

At block 16 of a set of operations 10 a second report is received indicating that the informality in the software instruction code causing the transaction processing error was corrected. For correcting the error, in some embodiments, a technician capable of correcting the error may be determined. A work order may be generated detailing the error and communicating the work order to the technician. The technician may troubleshoot the machine and correct the error, in which the case, the machine is capable of processing the transaction. In other embodiments, a script or corrective software code may be performed to correct the problem. For example, where the error is a result of a server not running, the system may execute a script to start the server.

After receiving the second report at block 16, an amount of time between receiving the first report and receiving the second report is determined, as shown in block 18. Based on such, the amount of time between receiving the first report and receiving the second report is compared with the time period for correcting the transaction processing error as shown in block 20.

At block 22 a visual indicator is generated based on determining whether the error was corrected in the preconfigured time period. Upon generating the visual indicator, the process may communicate the visual indicator as explained in block 24.

In some embodiments, the process 10 may be further configured to receive a history of errors. The history of errors comprises the type of errors that resulted as a result of informalities in the software instruction code. Based on receiving the history of errors, the process 10 may determine the number of times the initial informality occurred and generate the visual indicator based on this statistic. For example, where an error is a result of a server not running, the system will receive an error history and determine the number of time the server not running caused a similar error. A visual indicator would be generated based on that determination.

FIG. 2 provides a high level process flow 100 illustrating the process for generating a dynamic display for reporting work technology incidents, in accordance with embodiments of the invention. As illustrated in block 102, the process 100 is initiated when the system receives an incident report that a parameter upon which the machine relies for normal operation has been exceeded. As defined herein, a parameter is a point upon which the machine is measured to determine whether the machine is performing a function in a preconfigured manner. In some embodiments, the machine is capable of performing the functionality due to the machine receiving software instruction code that when executed by the machine causes the machine to perform the functionality, and executing the software instruction code to perform the functionality. In some embodiments, the software instruction code may be compiled. While in other embodiments, the software instruction code may be executed during runtime. In either case, the execution of the software instruction code results in the machine performing the function. In many embodiments of the invention, the machine will be able to handle multiple functions simultaneously or in a near simultaneous manner. For example, where a machine is a server, the server may be preconfigured with multiple applications, wherein each application is configured to perform a separate function.

The preconfigured manner upon which the machine performs its functionality is a matter of need and analysis and results in a parameter upon which the machine must function in order to operate in a normal manner. Determining whether the machine is operating within normal operating parameters will be discussed below. Determining a manner upon which a machine operates is dependent on the needs of the machine. For example, an engineer may determine that a machine preconfigured to handle emails must be capable of handling up to one-hundred emails at any given point in time. The decision may be based on business or financial decisions. Additionally, the decision may be based on past performance data. In this example, the rate at which the machine handles emails is a parameter of the machine. A parameter as defined herein is a measurable point of the machine which affects the ability of the machine to perform the function for which it was preconfigured to perform. Readings are taken on the parameter on a periodic basis. Readings may be taken by the machine performing the function or by an outside source. In some embodiments, the parameter is taken as a result of human interaction with the machine. For example, where a machine is preconfigured to handle email and the machine generates and communicates a message stating an email cannot be sent to a user, the user may acknowledge take the reading of the ability of the machine to process emails.

In some embodiments of the invention, taking readings on the parameter may be done in conjunction with a test. In some embodiments, a test is used to determine whether the machine performs the functionality in the preconfigured manner. The execution of a test may result in a pass/fail status of the parameter and has acceptance criteria for determining such a result. Additionally, the test may contain data to simulate a normal request so that the machine may perform the function. For example, a machine may be preconfigured with an application to communicate an email to an email server after a user has submitted an email to the email application. A test may be setup which contains data to simulate submitting an email to the system and acceptance criteria for the test of determining that the email was actually sent to the email server. After the test is initiated and the test submits the simulated email to the system, the test can then determine whether the email was actually sent. If the email was actually sent, the test results in a pass, else the test results in a fail. In some embodiments of the invention, the test may contain acceptance criteria in order to generate an error in the system, thus resulting in a pass on the test. This type of testing is best known as failure testing and is necessary to ensure a machine fails under certain conditions. For example, a test may be generated for an email system to determine that the system will not send an email if a simulated email presented to the system does not contain a proper email address. After the test is initiated and the email communicated to the application, the test would determine whether the email was sent. In the case the email was not sent, the test would result in a pass, otherwise the system would result in a fail.

After determining a function of the machine and at least a parameter that affects the ability of the machine to perform the function, limits must be established to determine whether a machine is performing normally or, in other words, whether the machine is operating within normal operating conditions. In some embodiments, the limits may be as simple whether the machine is operating or not. In some embodiments, the measurable parameter of the machine may contain states. For example, a parameter of a machine may determine whether the machine is on or off, wherein on and off are states. A limit of the parameter may be established that the machine is not operating within normal operating conditions if the machine is in an off state. In other embodiments, the readings of a parameter may be numerical and the limit for such a parameter may be a level. For example, a parameter of a machine may determine the number of emails the system is processing at any given point in time. Such a parameter is numerical in that it measures an amount. The limit may be a level detailing that normal operating conditions of the machine are when the machine is processing less than one-hundred emails at any given point in time. If a reading is taken that determines the machine is handling emails at a rate greater than one-hundred emails, the machine would be determined to be operating outside of normal operating conditions. In other embodiments, where the readings of the parameter are numerical, any statistical method may be used in defining limits and determining whether the machine is operating outside the limits. For example, a parameter of a machine may measure the average number of emails within a minute time period.

Referring back to the software instruction code of the machine, although the software instruction code directs the machine how to perform the function, the ability of the machine to perform the function may be dependent upon multiple factors of the machine. The ability of the machine may be limited based on software or hardware issues and parameters may be established upon each to monitor the normal operating condition of a machine. For example, a parameter may be established to determine the average processor load of a machine. A limit may be established detailing that any reading above 75% average load of processor would result in conditions outside normal operating conditions of the machine.

In other embodiments, Boolean logic may be used to determine whether a machine is operating within normal operating conditions by applying the Boolean logic to multiple parameters of the machine. For example, a machine may be operated in parallel with a second machine for redundancy of operation. The machine may have a parameter detailing normal operating conditions of the machine exist when the machine is on or when the second machine is on. In such an example, the parameter is satisfied if the machine is off as long as the other machine is on or both machines are on. Any Boolean logic may be used between any number of parameters and between the parameters of multiple machines to determine normal operating conditions.

It should be noted that the parameter is only an indication of an incident and is not necessarily indicative of the condition causing the incident. For example, a machine may be preconfigured to send emails. A parameter may be established to measure the ability of the machine to send the email. Further, the parameter may also have a limit that if a reading is received stating that an email was not sent, the machine would be operating outside of normal operating conditions. If a reading is received stating the system is operating outside of normal operating conditions, the reading does not necessarily state the cause of the incident. The incident in this case may be a result of a timeout error, a run-time error, or the like.

In some embodiments, generating the incident may be a result of catching errors as they occur within an application. The machine may be configured to catch errors as they occur and upon catching an error communicating that the error was received.

After the machine has been determined to be operating outside of normal operating conditions resulting in an incident, the incident is generated into an incident report and the incident report is received by the system.

As illustrated in block 104 of the process 100, the system determines a criticality of the incident. In some embodiments, the criticality of the machine is determined based on the criticality of the machine itself. For example, a machine with a functionality of handling millions of web requests an hour would be more critical than a machine that is used for testing upcoming web sites. In other embodiments, the criticality may be determined based on the level of an incident. An incident relating to a machine that has a complete loss of functionality would be more critical than a machine where the functionality is only impaired. In yet other embodiments, the criticality of an incident may be determined based on the reliability of a machine. Reliability may refer to, but is not limited to, redundancy of machines (i.e. where two or more machines comprise the same functionality), location of machinery (i.e. machine is located in an area prone to hurricanes), age of the machine, past incident history of the machine, software development issues of the machine (i.e. the application used to perform the functionality of the machine is in beta testing). In yet further embodiments, criticality may be determined based on the effect of the incident towards other factors. For example, a machine may have functionality that if lost would result in X amount of dollars lost per hour. In another example, in a web serving system, multiple machines may be dedicated to handling web requests, and a machine may be dedicated to directing the requests for load balancing. If the load balancing machine were to fail, no web requests would be directed. Therefore, the effect of the incident would result carry over to the ability of other machines to perform their functionality. In other embodiments, the criticality may be determined based on whether the machine is a bottle neck in a process. In yet other embodiments, the criticality rate is selected manually.

Block 106 of the process 100 illustrates identifying a required time to correct the incident in order to restore the parameter to normal operating conditions. In some embodiments, identifying the time required to correct the incident may be based on the criticality of the incident or any factor relating to determining the criticality of the incident. In other embodiments, determining the time required to correct the incident may be based on the resources required to correct the incident. In yet other embodiments, other factors may be taken into consideration in determining the time period to correct the incident, such as the availability of another machine capable of performing the functionality of the machine that suffered the incident, a calculated expense rate as a result of the incident, an availability of a technician capable of correcting the incident, automated processes in place to aid in correcting the incident, a probability that the incident will be self-correcting. In some embodiments, an incident may occur as a result of an outside factor. For example, a machine may be configured to handle web requests and to process emails. The machine has a parameter to monitor processor as to ensure that web requests are handled in a timely manner. The machine receives a mass surge of emails as a result of a mail merger that causes the average processor load to exceed normal operating conditions and as a result an incident report is generated. However, the system may be configured to realize based on a second parameter measuring email processing rate that the processor will likely become unloaded within a short period of time and therefore set a time to correct the incident to a short time period. Failure of the processor load rate to come into normal operating conditions by the time the time period expires would indicate that a second factor is compounding the incident and would therefore require additional action.

As illustrated in block 108 of the process 100, the system receives an indication that the parameter has been returned to normal operating conditions. After receiving the indication that the parameter has been returned to within normal operating conditions, the system in Block 110 of the process 100 determines an amount of time the parameter operated outside of normal operating conditions.

As illustrated in block 112 of the process, the system generates a visual indicator showing the amount of time the parameter operated outside of normal operating conditions which is communicated in block 114.

FIG. 2 illustrates a technology support reporting manager system environment 200, in accordance with various embodiments of this invention. As illustrated in FIG. 2, the entity server 208 is operatively coupled, via a network 201 to the user system 204, the technology support manager system (TSRM) 206, and the incident reporting system 210 to provide for collecting and reporting technology incident and work order data.

FIG. 3 illustrates only one example of an technology support reporting manager system environment 200, and it will be appreciated that in other embodiments of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communications between devices on the network.

In some embodiments, the user 202 is an individual that maintains an affiliation with the entity technology support manager system group. In this way, the user 202 may be an employee, manager, associate, customer, vendor, consultant, or another individual associated with technology support reporting management for the entity. In some embodiments, the user 202 may be a group manager or business manager for the entity. Furthermore, multiple individuals or entities may comprise a user 202, such as a group within the entity or multiple associates.

As illustrated in FIG. 3, the entity server 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 248 uses the communication device 246 to communicate with the network 201 and other devices on the network 201, such as, but not limited to the user system 204, audience systems 210, and/or triage server 206 over a network 201. As such, the communication device 246 generally comprises a modem, server, or other device for communicating with other devices on the network 201.

As further illustrated in FIG. 3, the entity server 208 comprises computer-readable instructions 254 stored in the memory device 250, which in one embodiment includes the computer-readable instructions 254 of an incident reporting application 256. In some embodiments, the memory device 250 includes data storage 252 for storing data related to the incident reporting application 256 including but not limited to data created and/or used by the incident reporting application 256.

In the embodiments illustrated in FIG. 3 and described throughout much of this specification, the incident reporting application 256 receives potential incident reports relating to technology owned and operated by the entity, compiles such incidents reports, and extracts data from such reports, and sends the data to the TSRM 206. The entity server may receive reports from the maintained system 210 automatically or from a user 202 using the user system 204, wherein the user 202 reports the incident manually.

The maintained system 210 may be a single server, computer, or device (individually "entity machine"). Additionally, the maintained system 210 may be made up of multiple servers, computers or devices owned, monitored (collectively "entity machines"), or operated by the entity.

The maintained system 210 are programmed and designed to carry out individual functionality using applications that are stored on the maintained system 210 and executed via a processing device of the maintained system 210. The functionality may be monitored locally on the maintained system 210 using management routines for testing and to determine whether the functions are operating properly or whether the system is operating. These management routines may be operated locally on the maintained system 210 or on an outside system such as the entity server 208. The management routines may periodically communicate test requests to the applications of the maintained server 210. For example, a maintained machine may execute an email servicing application that routes emails to individual users associated with the email application. The management routine may be configured to test the email application using a predefined test. The test may have preconfigured conditions that must be met by the application in order to for the test to succeed. Additionally, the test may determine the ability of the email application to fail in particular ways which would result in a success of the test. For example, the test may determine that the email application will not send an email if a field in a test email sent did not contain a proper email address. The management routine would monitor that the system failed to send the email and would result in a successful test.

In other embodiments, the management routing would monitor whether the maintained entity is functioning properly. In some embodiments, it may determine whether the machine is operating or shutdown. In other embodiments, it may determine whether the machine is operating within normal resources parameters (i.e. processor and memory are sufficient for the applications being executed). In yet other embodiments, the system may determine whether the system is communicating properly and that the system has sufficient capacity to handle the communication loads. For example, the management routine may be configured to send an email application with 1000 test emails within a second. The management routine would determine how fast the system could be able to process the emails. The management routine could determine whether the machine was fast enough in processing the emails and result in a successful test if the application handled all the emails within the required time and a failure if the application could not handle the emails within the required time.

When a management routine performs a test that results in a failure of the test, the management routing may communicate the result as an incident report to the incident reporting application 256 of the entity server 208.

Functionality of an application of the maintained system 210 may further perform error analysis of the maintained system 210. The errors may be run-time errors, compiling errors, etc. The maintained system 210 may automatically self-report run-time errors. For example, if the maintained system were a web server that received requests for performing a function in real-time and returning a web page based on the functionality. If performing the function resulted in a run-time error, the maintained system 210 may be configured to communicate an incident report to the incident reporting application 256 of the entity server 208.

In other embodiments, the user 202 may use a user system 204 to report an incident to the incident reporting application 256. In some embodiments the user system 204 may be part of the maintained system 210. As an example of this embodiment, the user 202 may be having a problem with an email client on the user system 204. The user 202 may communicate an incident report detailing the problem to the incident reporting application 256.

In some embodiments, the incident reporting application 256 may be used to generate work orders in order to correct the incident found on the maintained system 256. The work order may specify a technician capable of correcting the incident and appropriate operating instructions for the technician to correct the incident. The work order may further detail parameters relating to the maintained machine, which may include but is not limited to, the operating system of the maintained machine, hardware parameters, application parameters, test criteria, previous maintenance performed on the maintained machine.

As illustrated in FIG. 3, the entity server 208 generally comprises a communication device 246, a processing device 248, and a memory device 250. The processing device 248 is operatively coupled to the communication device 246 and the memory device 250. The processing device 248 uses the communication device 246 to communicate with the network 201 and other devices on the network 201, such as, but not limited to the entity server 208, the TSRM 206, the maintained system 210, and the user system 204. As such, the communication device 246 generally comprises a modem, Ethernet communication device, WIFI communication device, server, or other device for communicating with other devices on the network 201.

As illustrated in FIG. 3, the TSRM 206 generally comprises a communication device 236, a processing device 238, and a memory device, 240. The processing device 238 is operatively coupled to the communication device 236, and the memory device 240. The processing device 238 uses the communication device 236 to communicate with the network 201 and other devices on the network. Similar to the entity server 208, TSRM 206 typically comprises the same type of communication devices.

Included within the memory device 240 of the TSRM 206 are computer-readable instructions 242, which in one embodiment include the computer-readable instructions for the TSRM application 244.

In the embodiments illustrated in FIG. 3 and described throughout much of this specification, the TSRM application 244 may receive incident report data from the entity server 208, compile such data, and generate dynamic reports based on the data. In addition the TSRM 206 may be further configured to track incident parameters such as the time it took from the reporting of the incident until the incident was corrected or cleared.

As an example illustrated in FIG. 3, a maintained system 210 may be configured to execute an email application. The maintained system 210 has a built-in routine to communicate the occurrence of run-time errors that are generated as a result of processing emails. After receiving an untested email and generating a run-time error, the built-in routine generates an incident report detailing the run-time error and communicates the report to the incident reporting application 256. The incident reporting application 256 generates a work order detailing the run-time error and communicates the work order to a technician to inform the technician of the error. The TSRM application 244 communicates with the entity server 208 to receive the incident report. The TSRM application 244 determines a starting time of the incident report. After the technician corrects the error on the maintained system 210, the technician reports to the entity server 208 that the error was corrected. The TSRM server 244 communicates with the entity server 208 to receive the information that the error was corrected. The TSRM server 244 determines the time the error was corrected and calculates the total time the error was in place.

In other embodiments of the present invention, the TSRM application 244 may be configured to receive communications directly from the maintained system 210 and the user system 204. A user 202 may use the user system to provide additional information related to an incident report.

FIG. 4 illustrates a process flow of method 300 for presenting information related to technology incidents and work orders, in accordance with embodiments of the invention. The method 300 is initiated by downloading incident and work order data, as illustrated by block 302. As explained in FIG. 4, the TSRM 206 is configured to receive incident reports and work orders from the entity server 208. In some embodiments, the incident reports comprise information relating to an ability of a machine to perform a function has been reduced. In some embodiments, the entity server 208 receives information relating to an incident. The entity server 208 may receive the information as a result of a technician or a user manually entering in the information. In other embodiments, the information may be entered as a result of a monitoring system. In some embodiments, the entity server 208 may serve as the monitoring system. The monitoring system may monitor the ability of entity machines 210 to perform a function for which they were preconfigured to perform. In some embodiments, the entity machine 208 may receive logs and other reports relating from the entity machine detailing the ability of the machine to perform the function. For example, the entity machine may record processor usage, memory usage, errors generated, and the like which are received by the entity server 208. In other embodiments, the entity server 208 performs tests on the entity machines 210 to verify the functionality of the machine. Such tests may include functionality tests where the test comprises data that the entity machine would use as an input to performing a function, and an expected value that the machine would generate based on the received input. A satisfactory test would result if the results generated by the machine based on the input matches the expected results. In other embodiments, the machine would test the ability of the machine to handle loads. The test would attempt to pass in multiple requests to the machine within a short period of time. The test would comprise an expected time period for the machine to process the multiple requests and monitor the machine to determine the time the machine spent in processing the requests. A satisfactory test would result if the time the machine took to process the results were less than the expected time of the test.

The entity server 208 compares the data received from testing and from information communicated from the entity machines 210. Each parameter or test result is compared against limits to determine whether the machine has suffered an incident. Where the ability of a machine to perform a function has been reduced passed a limit, the machine is considered to have suffered an incident. Determining the limit may be based on multiple factors similar to those discussed in other portions of this specification.

After the entity server 208 has determined the machine has suffered an incident, the entity machine will generate an incident report detailing the incident. The incident report may include a timestamp relating to the start of the incident, machine information, test information and results, machine logs, generated errors, and the like.

In some embodiments, the entity server 208 communicates a work order as part of the downloading process. The work order may contain information contained in an incident report and include further information such as machine information, work procedures for correcting the incident, safety precautions, security credentials for accessing systems for correcting the incident, parts required to correct the incident, and information relating to technicians capable of correcting the incident.

As illustrated in block 304 of method 300 the TSRM Server 206 will remove duplicate incident reports and work orders. Depending on the manner which the ability of a machine to perform a function is actually monitored, an actual incident may receive multiple incidents reports. For example, the entity server may be monitoring the memory usage of a web server. The entity server compares readings taken during monitoring and compares such readings against a limit. The memory usage exceeds 90%, which results in the machine will have suffered an incident. The entity server receives an indication that the memory usage of the machine exceeded 90%. As a result, the entity server generated an incident report. Before any additional action could be taken, the memory usage fell below 90% and then subsequently rose above 90%, triggering the entity server 208 to generate an additional incident report. In another example, an employee may report an incident relating to a network outage. Due to the fact that multiple employees notice the network outage, other employees also report the network outage. For each time the network outage is reported, an incident report may be generated.

In order to reduce redundancy in reporting and to free up resources in handling multiple incident reports relating to the same incident, the system may determine that multiple incident reports have been generated for a given incident. In some embodiments, the TSRM server 206 may search for multiple incident reports based on a time period in which the incident reports were generated. The search may also include other factors such as the machine being monitored, the parameter or ability of the machine, and errors received from the machine. For example, an incident report may have been generated for an incident due to a machine having a high memory usage. A second report may also have been generated for the same incident due to a high processor usage. The incident reports may have been generated near the same period of time but are related to two separate parameters of the same machine. The TSRM server 206 may group the two incident reports together based on the period of time within which they were generated, and that both reports were related to the same machine. In other embodiments, where incident reports are generated based on a continuous series of incidents, the TSRM server 206 may determine that multiple incidents based on a single parameter within a given period of time are duplicates of one another. In filtering the incidents, the TSRM server 206 may determine which incident report to keep and which incident reports to filter. Such determination may be made based on the severity of the reading. For example, an intermittent incident may generate incident reports with a memory usage of 94%, 93%, and 98%. The system may determine to keep the incident report with 98% because of it is the most severe and remove the other incidents reports. Where the duplicate incident reports are based on multiple parameters. The TSRM server 206 may elect to merge the reports into one. For example, an incident report was generated as a result of a high processor usage of 95% and a second incident report was generated as a result of a high memory usage of 92%. The system may generate a new incident report detailing the high processor usage and the high memory usage.

Block 306 of method 300 illustrates uploading incident report data to a share drive. In some embodiments, data is stored within a share drive for visual inspection by technicians. This may be performed for quality assurance purposes. Additionally, storing data may be performed for data security.

As illustrated in block 308 of method 300, the TSRM server 206 deletes previous incident report data. In some embodiments, incident report data is stored so that it may be used to display on dashboards and to generate reports. The data may be stored in a dump and the dump is used to update the dashboards and the report. In some embodiments, in order to properly update the reports, the previous dump may need to be removed prior to replacing it with a subsequent dump of data.

Block 310 of method 300 illustrates converting the incident report data into structured data for displaying on a dashboard. In order to display the data on a dashboard the TSRM may transform the structure of the data from that received from the entity server 208 into a format required by the dashboard. In some embodiments, the structure may include Hyper Text Markup Language (HTML), Extensible Markup Language (XML), Javascript Object Notation (JSON), or any other format that supports structure of data. In other embodiments, the data may be formatted for use in a database. The database may be a relationship type database or an object type database.

As illustrated in block 312 of method 300, the TSRM server 206 publishes the data on TSRM dashboards. In some embodiments, the dashboards are published as part of a web interface. The web interface may comprise elements that may be typically found on a web page which include, but are not limited to, scripts, structured elements, styling, third party plugins, and the like. The Dashboards present to a user, the incident report data in a user-friendly format. Examples of dashboards and the functionality of the dashboards will be displayed in other sections of this specification. The dashboards allow the user to filter the incident report data. Such filtering may be based on a machine, a date range for which incidents would have occurred within, a location of the machine, information relating to business groups that manage the machine, and priority information of the incident.

Block 314 of method 300 illustrates verifying the structured data against the incident report data. In some embodiments, the TSRM server 206 may perform a quality assurance check to verify that the information being displayed on the dashboards matches information from the incident report data. If the TSRM server 206 determines that information was not properly displayed, the server may update the data to replace the missing information.

As illustrated in block 316 of method 300, the TSRM server 206 receives a request to view a report. In some embodiments, the user 9 is provided, on the dashboard, a means of generating a report. Such reports may be generated using the same parameters for filtering the dashboards, as mentioned herein. After the TSRM server 206 receives the request to generate the report, the server performs the steps necessary to generate the report as illustrated in block 208. Generating the report is based on the information received from the user and the incident report data. The reports may further include work orders related to the incidents.

As illustrated in block 320 of method 300, the TSRM server 206, presents the reports to the user. It is important to note that the reports may be based on web technologies; and may therefore be dynamic. As defined herein, the term dynamic shall refer to the ability of a user to interact with tools included within the report to send requests to the TSRM system 206 in order to update the report based on the user interacting with the tools, as illustrated in block 322. For example, a report may include a tool to adjust the date range for which the incident reports are included. After selecting a new date range, the system will update the report with the data related to incident reports that fall within such a date range. In another example, the report may include a tool for selecting a country in which the incident reports occurred. By selecting the country, the server may update the report to show the country and incident reports that occurred within such country.

FIGS. 5a and 5b is an example of a multi-part form 400 for the purpose of gathering information from a user in order to generate a report to display information related to technology incidents and work orders. In this particular example, the user may be required to submit particular pieces of information such as a start date and an end date for determining incidents and work orders during that period of time. Additionally, other pieces of information may be optional for the user to supply in order to generate the report. However, whether the information is mandatory or optional, the system will utilize all information in order to generate the report. In this particular example, the form 400 is broken up into multiple pages 402/404 for creating an aesthetically pleasing user experience. The form 400 presents navigation controls for the user to move between the multiple pages 402/404. A reset button 406 may be included on the form 400 for resetting the information included on the form 400. The form 400 may also include a submit button 408 for the purpose of making a request containing the information of the form 400 to the TSRM server 206. The form 400 may be configured to disable the submit button 408 until all the required information has been supplied by the user. After all the required information has been submitted, the form 400 may enable the submit button 408. The form may include links 410/412/414 for displaying incident and work order data in a table form. Link 410 presents to the user a table for abandoned incidents. Link 412 presents to the user a table for work orders. Link 414 presents to the user a table for all incidents.

Included on page 402 are several pieces of controls by which the user may include supply information to the form 400 necessary for the TSRM system 206 to generate the report. First, form 400 includes a control for entering in a start date and an end date. This control instructs the TSRM system 206 to include only incidents and work orders that were generated during those dates to generate the report. Second, the form 400 includes a control for entering in country and city data. Incidents may be tracked through multiple countries. Supplying a country and a city may instruct the TSRM system 206 to only include incidents and work orders generated in the country and city respectively. Third, form 400 may include a control for supplying business related information. This may include information related to a particular business group within a company, a manager, a technician, and the like. Supplying the business related information instructs the TSRM 206 to filter the incidents and work orders based on the corresponding business information included with the incidents and work orders. Fourth, form 400 may further include controls for detailing the priority of the incident and/or work order.

Included on page 404, form 400 includes additional controls for instructing the TSRM system 206 to generate the report. Form 400 includes a control that allows the user to select a report type. Form 400 only allows the user to select one report type from the options presented. However, in other embodiments, a form may allow a user to select multiple report types. By a user selecting multiple report types, the system may generate a report for each report type selected. Also, Form 400 includes a control to specify the frequency of the data used to generate the report. In Form 400, the user is capable of selecting a frequency of "Daily", "Weekly", or "Monthly." Additional frequencies may be included, such as "Quarterly", "Annually", and so forth. Form 400 allows the user to select only frequency type for generating the report. However, in other embodiments, additional forms may allow the user to select multiple frequency types which instructs the TSRM system 206 to generate a report based on each frequency type submitted. The frequency type instructs the TSRM system 206 to group the incidents and the work orders together into groups of time based on the frequency type.

Each of the report types presented in form 400 will be presented individually within corresponding sections included in this specification.

FIG. 6 illustrates report 500 which is generated as a result of submitting the form 400 to the TSRM server 206. In some embodiments, the report 500 may be a static document. In other embodiments, the report 500 may be dynamic. The report 500 may include various interactive tools that allow a user 202 to interact with the report 500 in order to update the report with information. In some embodiments, the report 500 comprises all the information needed for displaying as the user interacts with the various tools on the report. Depending on how the user interacts with the tools, the report 500 will update based on such interaction with the information stored within the report 500. In other embodiments, the report does not include all the information needed for displaying, but does contain scripts that are triggered based on the user 202 interacting with the tools. These scripts communicate back to a server to gain the information necessary to update the report 500. For example, the report may contain a tool for selecting incident reports associated with a country. The report may include a tool that allows the user to select different countries. As the user selects a country using the country selector tool, the report causes a script to be executed which causes the machine displaying the report to communicate with the TSRM server 206. Based on receiving the communication, the TSRM server generates the data necessary for updating the report 500. The TSRM server may then communicate the data necessary for updating the report 500 back to the machine displaying the report. The machine updates the report to display the new information.

In some embodiments of the invention, the TSRM server 206 may generate several reports that are each dynamic and communicate the several reports to a machine for a user 202 to view each of the reports. These reports may be collectively displayed using a central dynamic report and may each be viewed by the user selecting a tab tool 502. The tab tool allows the user to view each report in turn, thus allowing the user 200 to not become inundated with all the information of the report. In some embodiments, the TSRM server 206 may not generate all the reports but as previously taught, only generate a script that is executed when the user interacts with the tab tool 502. The TSRM server 206 generates a report when the user 202 selects a tab associated with such a report. The report is displayed based on the machine receiving the report.

The report 500 may also include other interactive tools such as a filter box 504. The filter box may be used to filter data on the report. In some embodiments, the filter box may be a text box where the user 202 enters a string which is used to filter the displayable information on the report. In other embodiments, the filter box 504 may be a drop down box filled with preconfigured options. The user may select one of the preconfigured options which may cause the report 500 to update the displayable data. In some embodiments, the filter box 504 may offer the user to select at least a country, a report type, a business group, a technician, a priority code for an incident.

In some embodiments, the report contains graphical tools 506/508/510/512. The graphical tools may be used to display the information included in the report. Each graphical tool may display in a unique format, thus providing the user to view the data in multiple ways in order to view anomalies in the data. The graphical tools may be moved, resized, minimized, maximized, or closed. In some embodiments, each graphical tool may filter the data presented by the report different from the other graphical tools. For example, one graphical tool may show the data by a weekly period, while another graphical tool displays the same data using a monthly period. In another example, one graphical tool may show data relating to a first country, while the second graphical tool displays information relating to a second country. It should be noted that the system may have any number of graphical tools to aid the user 200 in viewing the data represented by the report 500. In some embodiments, a graphical tool may display the data using a chart. The graphic tool may further present to the user an option to change the chart type. For example, the graphic tool may present, to the user 202, the option to select between a pie chart, a line, chart, and a bar chart. Using the same information, the graphic tool displays the data using the selected chart type as the user selects a chart type.

In some embodiments of the invention, the report 500 may be configured to periodically poll the TSRM server 206 in order to receive real-time updates. Based on receiving a response from the TSRM server 206, the system may update the displaying data using the graphical tools.

FIGS. 7*a*, 7*b*, and 7*c* illustrate various embodiments of the graphical tools 506/508/510 as presented in report 500. It should be noted that these only represent some of the ways that data may be represented using graphical tools. FIG. 7*a* is an embodiment of a graphical tool 602 displaying a map of the world. Included in this graphical tool 602 are buttons available to the user to select various countries. Upon selecting such a country, the graphical tool 602 updates to display a map of the country selected. This graphical tool 602 may also include different overlays to present data. For example, the graphical tool 602 may include an intensity map to show the number of incident reports being generated within a specific country. In another example, the overlay may show the location of various machines being monitored and the status of each system. In other embodiments, the graphical tool 602 allows the user to zoom in and out using a variety of methods (i.e. pinch and zoom on a touch display or touchpad, or using the wheel on a mouse). In other embodiments, the graphical tool 602 may allow the user to select a country by other methods (i.e. tapping the country on a touchpad, or clicking on the country using a mouse). Regardless of the method that the user uses to select the country, the graphical tool 602 may be configured to update the report 500 based on the user selecting the country. For example, a report 500 may include information for the entire world. By a user 202 selecting a country using the graphical tool 602, the report may update with country specific information for the country selected.

FIG. 7*b* illustrates a graphical tool 604. This particular graphical tool 604 may present data of the report 500 using a series of charts. In some embodiments, the graphical tool 604 may present, to the user, an option for different charts. In other embodiments, the graphical tool may also present, to the user, an option for selecting the periodicity of the chart (i.e. yearly, monthly, etc.).

FIG. 7*c* illustrates a graphical tool 606. This graphical tool 606 presents data of the report 500 using gauges. The graphical tool 606 may include multiple gauges each displaying a different type of data. In some embodiments, each gauge may represent a different country and all the data combined. In other embodiments, the gauges may each display a different criticality rating of the data presented.

As will be appreciated by one of ordinary skill in the art, reports, forms, and other information may be presented to a user based on the user communicating a request, using a web browser installed on a computer, to a web server. The request may use communicated to the web server using a standard protocol such as the Hyper Text Transfer Protocol (HTTP). Such a request may include information sufficient to instruct the web server to perform tasks and generate a response.

The web server may be configured to authenticate the request from the user prior to performing a function or generating a request. Authentication may be performed by receiving a username and password as a result of the user entering in the username and password into the web browser separate from sending the request, such as using HTTP Basic Authentication. Further authentication may be as a result of receiving a token included in the request. For example, the web server may be configured to authenticate the user using a username and password. After the web server has authenticated the user, the web server may include a token in the response communicated back the web browser. The web browser may be configured to store the token in memory and communicate the token back to the web server with each subsequent request. The web server may receive the token and authenticate the user based on the token. Some of the ways that tokens may be used for authenticating the user include, but is not limited to, web browser cookies, sessions variables, and caching. In yet other embodiments, the request may be authenticated using other methods such as Open Authentication.

As stated above, the web server may be configured to generate a response based on the information in the request.

The response may include information necessary to instruct the web browser to perform at least one function. Typically, but is not necessary, the at least one function may include presenting information back to the client. Such information may be a web page, wherein the page may comprise standard text, Hyper Text Markup Language (HTML), Extensible Markup Language (XML), scripts such as Javascript, and styling information such as Cascading Styling Sheets (CSS). In other embodiments, the response may include structured information such as Javascript Object Notation (JSON).

In addition to causing the web browser to present information to the user, the response may further include instructions for allowing the user to interact with the web page and for manipulation of the information included as part of the web page. Particularly, the instructions may cause the web browser to communicate additional requests to the web browser or to other web servers. These requests may be submitted automatically by the browser or as a result of interaction of the user with the browser. These requests may be submitted in such a way that it is not necessary for the browser to refresh in order to display information included in a response. Such a request may be accomplished using an Asynchronous Javascript and XML (AJAX).

Communication between the web browser and the web server may be performed over any standard network. Such networks may be wired, wireless, or a combination of both. As defined herein, the term web browser may also refer to any web enabled application. Such application may be operated on at least a desktop computer, a laptop, a tablet or other mobile device, or any device capable of communicating a request web request and receiving a response over such a network.

The system may be deployed into a distributed network where the system monitors the performance of transactions between multiple computing communicating on the network. The network may be a subnet of a larger network, wherein the network allows communication between the computing devices on the network and other devices that are part of the larger network. Additionally, the network may be configured to filter communication between communication devices on the network and devices that are part of the larger network. The system may be configured to monitor transactions that are performed by a computing device on the network. Such monitoring may be accomplished by the system acting as a gateway in which the system receives all communication transferred over the network. In addition, the system may further monitor the computing devices by communicating a test communication to the computing device and receiving a response back from the computing device based on the computing device performing the transaction. Where the system is configured to communicate a test communication to the computing device, the system may further compare the response received from the computing device with a test response to determine whether the computing device successfully performed the transaction.

One example of a system being deployed in a distributed network includes instances where the distributed network is used by a financial institution. The system may be deployed in the financial institution distributed network to monitor communication transactions being performed by computing devices within the financial institution distributed network. The computing devices within the financial institution distributed network may include servers or other computing devices that conduct such communication transactions. The system may be configured to monitor communication transaction that would normally occur within a distributed network that is maintained by a financial institution. Additionally, the computing device may further be configured to communicate test communication transactions to the computing devices located within the distributed network maintained by the financial institution to simulate different communication transactions that would normally be received by computing devices found within such a distributed network. These simulated communication transactions determine whether the computing device is capable of performing an actual communication transaction. Under such an embodiment, the system may be configured to receive a response from the computing device after the computing device has attempted to perform a function based on receiving the communication transaction. Based on receiving the response, the system may determine whether the computing device successfully performed the 1 function associated with receiving the communication transaction. Based on the system monitoring the computing devices within the financial institution distributed network, the system may generate reports based on such monitoring. This monitoring may include generating displayable reports. Such reports may be interactive and provide real-time information concerning the ability of the computing devices to perform a communication transaction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and presenting a visual indicator based on determining that a software instruction code causing a transaction processing error was corrected within a predetermined time period, the system comprising:
    a non-transitory storage device;
    a communication device;
    at least one processor operatively coupled to the storage device and the communication device; and
    at least one module stored in said storage device and comprising instruction code that is executable by the at least one processor and configured to cause said at least one processor to:
        receive a first report of the transaction processing error, the error comprising an informality in the software instruction code executed during a first attempt to process a transaction;
        determine a time period for correcting the software instruction code causing the transaction processing error;
        receive a second report that the informality in the software instruction code causing the transaction processing error was corrected based on an execution of the corrected software instruction code during a second attempt to process the transaction;
        determine an amount of time between receiving the first report and receiving the second report;
        compare the amount of time between receiving the first report and receiving the second report with the time period for correcting the transaction processing error;
        determine whether the software instruction code causing the transaction processing error was corrected within the predetermined time period based on comparing the amount of time between receiving the first report and the second report with the time period for correcting the transaction processing error;
        generate the visual indicator based on determining whether the error was corrected within the predetermined time period; and
        communicate the visual indicator.

2. The system of claim 1, wherein said at least one module further comprises instruction code for causing said at least one processor to identify a technician capable of correcting the software instruction code causing the transaction processing error, generate a work order detailing the error and a procedure for correcting the error, and communicate the work order to the technician.

3. The system of claim 1, wherein the software instruction code is executed by a machine; wherein said at least one module further comprises instruction code for causing said at least one processor to determine a transaction processing rate of the machine; and wherein determining the time period for correcting the software instruction code causing the transaction processing error is based at least in part on the transaction processing rate of the machine.

4. The system of claim 1, wherein said at least one module further comprises instruction code for causing said at least one processor to:
    determine a second machine capable of executing the software instruction code in order to process the transaction; and communicate a request to the second machine to execute the software instruction code to process the transaction; and wherein determine the time period for correcting the software instruction code causing the transaction processing error is based at least in part on the communicating the request to the second machine.

5. The system of claim 1, wherein said at least one module further comprises instruction code for causing said at least one processor to receive a history of errors, determine a number of times the transaction processing error has occurred based on receiving the history of errors; and wherein generating the visual indicator is based on the number of times the transaction processing error has occurred.

6. The system of claim 1, wherein the visual indicator is a report; wherein said at least one module further comprises instruction code for causing said at least one processor to receive user input for filtering the report; and wherein generating the visual indicator is based on receiving the user input.

7. The system of claim 1, wherein the visual indicator is a dynamic report comprising an interactive user control, wherein said at least one module further comprises instruction code for causing said at least one processor to receive a request to update the report based on a user interacting with the interactive user control, and update the visual indicator based on receiving the request.

8. A computer program product for generating and presenting a visual indicator based on determining that a software instruction code causing a transaction processing error was corrected within a predetermined time period, the computer program product comprising a non-transitory computer-readable storage medium having computer-executable program code portions, the computer-executable program code portions comprising:

an executable portion configured for receiving a first report of the transaction processing error, the error comprising an informality in the software instruction code executed during a first attempt to process a transaction;

an executable portion configured for determining a time period for correcting the software instruction code causing the transaction processing error;

an executable portion configured for receiving a second report that the informality in the software instruction code causing the transaction processing error was corrected based on an execution of the corrected software instruction code during a second attempt to process the transaction;

an executable portion configured for determining an amount of time between receiving the first report and receiving the second report;

an executable portion configured for comparing the amount of time between receiving the first report and receiving the second report with the time period for correcting the transaction processing error;

an executable portion configured for determining whether the software instruction code causing the transaction processing error was corrected within the predetermined time period based on comparing the amount of time between receiving the first report and the second report with the time period for correcting the transaction processing error;

an executable portion configured for generating a visual indicator based on determining whether the error was corrected within the predetermined time period; and an executable portion configured for communicating the visual indicator.

9. The computer program product of claim 8, wherein the computer-executable program code portions further comprise:

an executable portion configured for identifying a technician capable of correcting the software instruction code causing the transaction processing error;

an executable portion configured for generating a work order detailing the error and a procedure for correcting the error; and an executable portion configured for communicating the work order to the technician.

10. The computer program product of claim 8, wherein the software instruction code is executed by a machine; wherein the computer-executable program code portions further comprise an executable portion configured for determining a transaction processing rate of the machine; and wherein determining the time period for correcting the software instruction code causing the transaction processing error is based at least in part on the transaction processing rate of the machine.

11. The computer program product of claim 8, wherein the computer-executable program code portions further comprise an executable portion configured for determining a second machine capable of executing the software instruction code in order to process the transaction; and an executable portion for communicating a request to the second machine to execute the software instruction code to process the transaction; and wherein determining the time period for correcting the software instruction code causing the transaction processing error is based at least in part on the communicating the request to the second machine.

12. The computer program product system of claim 8, wherein the computer-executable program code portions further comprise an executable portion configured for receiving a history of errors, an executable portion configured for determining a number of times the transaction processing error has occurred based on receiving the history of errors; and wherein generating the visual indicator is based on the number of times the transaction processing error has occurred.

13. The computer program product system of claim 8, wherein the visual indicator is a report; wherein the computer-executable program code portions further comprise an executable portion configured for receiving user input for filtering the report; and wherein generating the visual indicator is based on receiving the user input.

14. The computer program product system of claim 8, wherein the visual indicator is a dynamic report comprising an interactive user control, wherein the computer-executable program code portions further comprise an executable portion configured for receiving a request to update the report based on a user interacting with the interactive user control, and an executable portion configured for updating the visual indicator based on receiving the request.

15. A computer-implemented method for generating and presenting a visual indicator based on determining that a software instruction code causing a transaction processing error was corrected within a predetermined time period, the computer-implemented method comprising:

receiving, via a processing device, a first report of the transaction processing error, the error comprising an informality in the software instruction code executed during a first attempt to process a transaction;

determining, via a processing device, a time period for correcting the software instruction code causing the transaction processing error;

receiving, via a processing device, a second report that the informality in the software instruction code causing the transaction processing error was corrected based on an execution of the corrected software instruction code during a second attempt to process the transaction;

determining, via a processing device, an amount of time between receiving the first report and receiving the second report;

comparing, via a processing device, the amount of time between receiving the first report and receiving the second report with the time period for correcting the transaction processing error;

determine, via a processing device, whether the software instruction code causing the transaction processing error was corrected within the predetermined time period based on comparing the amount of time between receiving the first report and the second report with the time period for correcting the transaction processing error;

generating, via a processing device, a visual indicator based on determining whether the error was corrected within the predetermined time period; and communicating, via a processing device, the visual indicator.

16. The computer-implemented method of claim 15, wherein the method further comprises identifying a technician capable of correcting the software instruction code causing the transaction processing error, generating a work order detailing the error and a procedure for correcting the error, and communicating the work order to the technician.

17. The computer-implemented method of claim 15, wherein the software instruction code is executed by a machine; wherein the method further comprises determining a transaction processing rate of the machine; and wherein determining the time period for correcting the software instruction code causing the transaction processing error is based at least in part on the transaction processing rate of the machine.

18. The computer-implemented method of claim 15, wherein the method further comprises determining a second machine capable of executing the software instruction code in order to process the transaction; and communicating a request to the second machine to execute the software instruction code to process the transaction; and wherein determining the time period for correcting the software instruction code causing the transaction processing error is based at least in part on the communicating the request to the second machine.

19. The computer-implemented method of claim 15, wherein the method further comprises receiving a history of errors, determine a number of times the transaction processing error has occurred based on receiving the history of errors; and wherein generating the visual indicator is based on the number of times the transaction processing error has occurred.

20. The computer-implemented method of claim 15, wherein the visual indicator is a report; wherein the method further comprises receiving user input for filtering the report; and wherein generating the visual indicator is based on receiving the user input.

* * * * *